United States Patent [19]

Akiyama et al.

[11] Patent Number: 5,602,938

[45] Date of Patent: Feb. 11, 1997

[54] METHOD OF GENERATING DICTIONARY FOR PATTERN RECOGNITION AND PATTERN RECOGNITION METHOD USING THE SAME

[75] Inventors: Teruo Akiyama, Yokohama; Minako Sawaki, Tokyo; Takahiko Kawatani, Yokohama, all of Japan

[73] Assignee: Nippon Telegraph and Telephone Corporation, Tokyo, Japan

[21] Appl. No.: 246,520

[22] Filed: May 20, 1994

[51] Int. Cl.$^6$ ................................ G06K 9/62; G06K 9/48
[52] U.S. Cl. ........................ 382/155; 382/197; 382/224
[58] Field of Search ................................ 382/155–161, 382/178–179, 185–187, 200, 224, 225, 228, 197, 198

[56] References Cited

U.S. PATENT DOCUMENTS

| | | | |
|---|---|---|---|
| 5,005,205 | 4/1991 | Ellozy et al. | 382/187 |
| 5,077,807 | 12/1991 | Bokser | 382/160 |
| 5,191,622 | 3/1993 | Shojima et al. | 382/185 |
| 5,255,342 | 10/1993 | Nitta | 395/2 |
| 5,335,289 | 8/1994 | Abdelazim | 382/177 |
| 5,335,291 | 8/1994 | Kramer et al. | 382/158 |
| 5,337,371 | 8/1994 | Sato et al. | 382/100 |
| 5,479,570 | 12/1995 | Imagawa et al. | 395/20 |

OTHER PUBLICATIONS

Kawatani, "Handprinted numeral recognition with the learning quadratic discriminant function", IEEE Comput. Soc. Press, pp. 14–17, Oct. 1993.

Kawatani, "Handprinted numerals recognition by learning distance function", Systems and Computers in Japan, vol. 25, No. 10, 1994, pp. 62–71.

Dasarathy, "An integrated non–parametric sequential approach to multi–class pattern classification", Int. J. Systems, vol. 4, No. 3, May 1973, pp. 449–460.

Kimura et al, "Modified quadratic discriminant functions and the application to Chinese character recognition", IEEE Tran. on Pattern Analysis and Machine Intelligence, vol. PAMI-9, No. 1, Jan. 19.

Juang et al, "discriminative Learning for Minimum Error Classification", IEEE Transactions on Signal Processing, vol. 40, No. 12, Dec. 1992.

*Primary Examiner*—Leo Boudreau
*Assistant Examiner*—Bhavesh Mehta
*Attorney, Agent, or Firm*—Pollock, Vande, Sande & Priddy

[57] ABSTRACT

A reference pattern vector is obtained from training patterns belonging to each class and is held as a parameter of an original distance function in a distance dictionary. A discriminant function is defined which has, as variables, the difference between respective corresponding components of a feature vector of each training pattern and the corresponding reference pattern vector and the square of the difference. Training patterns of all classes are discriminated with the original distance function and a rival pattern set, which includes patterns misclassified as belonging to a respective class, is derived from the results of discrimination of the training patterns. A discriminant analysis is made between the training pattern set of each class and the corresponding rival pattern set to thereby determine parameters of the discriminant function, which are held in a discriminant dictionary. The original distance function and the discriminant function are additively coupled together by a predetermined coupling coefficient to define a learned distance function, which is used to discriminate the training patterns to update the learned distance function.

20 Claims, 8 Drawing Sheets

METHOD OF GENERATING DICTIONARY FOR PATTERN RECOGNITION AND PATTERN RECOGNITION METHOD USING THE SAME

BACKGROUND OF THE INVENTION

The present invention relates to a pattern recognition method or scheme using a dictionary in various types of pattern recognition, including character reading and, more particularly, to a method of composing a dictionary for use in the case of employing a distance function as a discriminant function and a pattern recognition method using the dictionary.

A brief description will be given of the most commonly used procedure for handprinted or handwritten character recognition which is a typical example of pattern recognition. For each of characters of all classes (referred to also as categories) which are likely to be used (0 through 9 when the characters to be recognized are numerals, for example), a number of handprinted characters are gathered or collected as learning character patterns (also called training patterns or learning samples) and features of respective training patterns in each class are extracted and each expressed as an M-dimensional vector $x=(x_1, \ldots, x_M)$. Next, calculations are made of, for example, means $\mu_1=\bar{x}_1, \mu_2=\bar{x}_2, \ldots, \mu_M=\bar{x}_M$ of corresponding components of the feature vectors of all training patterns in each class, and the average vectors $\mu=\mu_1, \ldots, \mu_M$) thus obtained are used as reference pattern vectors. In this way, such a reference pattern vector is predetermined for every class of characters.

To recognize an arbitrary handwritten character pattern, its feature vector $x=(x_1, \ldots, x_M)$ is obtained first, then the distance between the feature vector x and the reference pattern vector $\mu$ of every class to be recognized is calculated using a distance function as a discriminant function, and a character of the class closest to the feature vector x is selected and output as a recognition result for the input pattern. A variety of parameters have been proposed to express features of character patterns, but as long as they are represented by vectors, the principles of the present invention have nothing to do with the kinds of feature parameters used and the way of determining them. The present invention rather concerns how the distance function which defines the distance between the feature vector of the input pattern and the reference pattern vector should be modified to increase the character recognition accuracy.

The character recognition utilizes the distance function as the discriminant function in many cases. There are known, as distance functions, a Euclidean distance, a weighted Euclidean distance, a quadratic discriminant function (or Bayesian discriminant function), and a modified quadratic discriminant function and a projected distance, for instance. To provide increased recognition accuracy in the case of using the distance function, it is customary to faithfully represent the distribution of features $(x_1, \ldots, x_M)$ in each class of the characters to be read. In contrast to the Euclidean distance, the weighted Euclidean distance utilizes, as the weight, the inverse of the variance of corresponding feature components of the respective classes, i.e., the corresponding components of the feature vectors. The weighted Euclidean distance provides higher recognition accuracy than does the Euclidean distance. The quadratic discriminant function, the modified quadratic discriminant function and the projected distance utilize a covariance matrix of features in each class and its eigenvector and eigenvalue for discrimination, and hence provide high accuracy even if the features are correlated. However, these methods have technical limitations and cannot be expected to achieve higher accuracy.

Another important viewpoint to increase the accuracy of character recognition is to emphasize differences of each class from the others. One possible method that has been proposed to implement it is to modify the distance between the input pattern and each class, which is obtained when the discrimination of the input pattern is made using the distance function, so that the distance between the input pattern and the class to which the input pattern belongs is short, whereas the distance between the input pattern and the class to which it does not belong is long.

To make such a modification to the distance between the input pattern and each class, it is necessary to employ a function which produces negative values for patterns belonging to the class concerned and positive values for patterns not belonging to the class. To this end, it is possible to use such a method as disclosed in a literature [Kawatani, et al., "Improvement of Discriminant Function by Superposition of Distance Function and Linear Discriminant Function," '89 Autumn National Conference of the Institute of Electronics, Information and Communication Engineers of Japan, D-166, pp. 6–166 (1989)].

According to this method, the weighted Euclidean distance, the quadratic discriminant function or the like is used as the distance function, and a pattern set of each noticed class and a misread or nearly-misread pattern set (a rival pattern set) for the noticed class which are obtained by the discrimination of training patterns with the original distance function, are subjected to a discriminant analysis using either the difference between each component of the feature vector of the training pattern and the corresponding component of the reference pattern vector or the square of the difference as a variable, whereby an intended function (called a discriminant function) is obtained. In the actual discrimination, the distance value of each class obtained with the original distance function is added to a value obtained with the discriminant function for each class, and the resulting added value is used to determine the class of the input pattern. A method for obtaining the rival patterns will be described later.

In this conventional method, the value obtained with the discriminant function for each class is added to each distance obtained with the original distance function to thereby produce the same effect as that by the modification or correction of the weight vector of the original distance function or the reference pattern vector. That is, when the difference between each component of the feature vector of the training pattern and the corresponding component of the reference pattern vector is used as a variable in the discriminant analysis, the reference pattern vector is corrected, and when the square of the difference is used, the weight vector is corrected.

With this method, however, the weight vector and the reference pattern vector are corrected independently of each other; therefore, they cannot be corrected in the optimum combination—this imposes limitations on improvement of the recognition capability.

SUMMARY OF THE INVENTION

It is therefore an object of the present invention to provide a method of generating or composing a dictionary for pattern recognition which obviates the above-mentioned defect of the prior art and permits improvement of the recognition accuracy by simultaneous and optimum correction of reference pattern vectors, weight vectors or constant terms appearing in the original distance function.

Another object of the present invention is to provide a pattern recognition method using the above-mentioned dictionary.

According to the present invention, a training pattern set of each noticed class and a misread or nearly-misread pattern set (hereinafter referred to as a rival pattern set) for the noticed class obtained as the result of the recognition of training patterns with the original distance function, are subjected to a discriminant analysis using both of the difference between each component of the feature vector of the training pattern and the corresponding component of the feature vector of the reference pattern and the square of the difference as variables, or using, as a variable, each component of a vector which is provided by projecting in a subspace a vector obtained by subtracting the feature vector of the reference pattern stored in the dictionary from the feature vector of the training pattern, and the square of the said each component. By this, an intended discriminant function is obtained.

By using the sum of the value obtained with the original distance function for each class and the value obtained with the discriminant function for each class in the actual recognition, the reference pattern vectors, weight vectors and constant terms appearing in the original distance function can be corrected simultaneously and optimally—this would substantially increase the recognition accuracy.

DESCRIPTION OF THE PREFERRED EMBODIMENT

Figure 1:
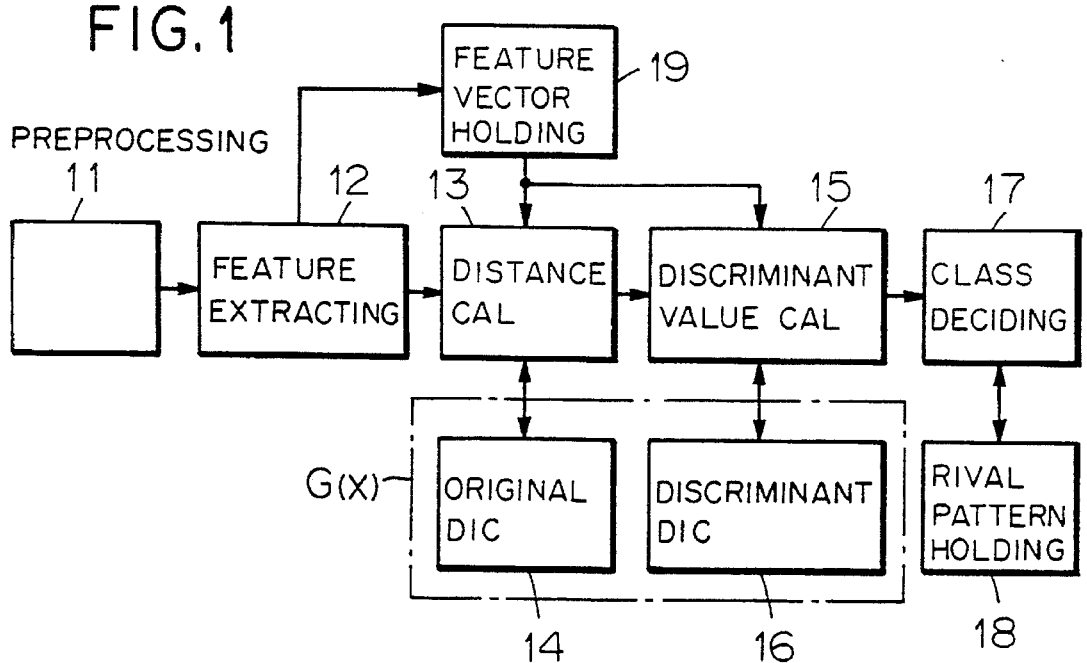
FIG. 1 is a block diagram illustrating an embodiment of the present invention for generating a dictionary for pattern recognition and for pattern recognition using it.

FIG. 1 is a block diagram for explaining the operation of an embodiment of the present invention. Reference numeral 11 denotes a preprocessing part, 12 a feature extracting part, 13 a distance calculating part, 14 an original dictionary, 15 a discriminant value calculating part, 16 a discriminant dictionary, 17 a class deciding part, 18 a rival pattern holding part and 19 a feature vector holding part.

The recognition of an input pattern begins with preprocessing by the preprocessing part 11 to normalize the position and magnitude of the pattern and remove therefrom noise, after which the features for use in recognition are extracted as a feature vector $x=(x_1, \ldots, x_M)^t$ by the feature extracting part 12, t indicating transposition. In the distance calculating part 13, a predetermined desired original distance function D(x) is used to obtain the distance between the feature vector of the input pattern to be recognized and each reference pattern vector of all classes read out of the original dictionary 14. In the discriminant value calculating part 15, the value of a discriminant function F(x), which is provided when a learned distance function G(x) is represented by the following equation, is calculated for each class.

$$G(x)=D(x)+\gamma_E(x) \qquad (1)$$

The discriminant function F(x) of each class is prestored in the discriminant dictionary 16 and is designed to have a negative or positive value, depending on whether the input pattern belongs to the class or not. Hence, the discriminant function F(x) of each class reflects the difference between the class and the others.

In the class determining part 17, the value of the learned distance function G(x) of Eq. (1) is calculated for each class and the class that provides the smallest value is selected and determined as the class to which the input pattern belongs. Incidentally, the coupling coefficient γ is a predetermined constant. Here, what kind of function can be used as the original distance function D(x) and how the discriminant function F(x) is determined are problems to be solved.

Figure 2:
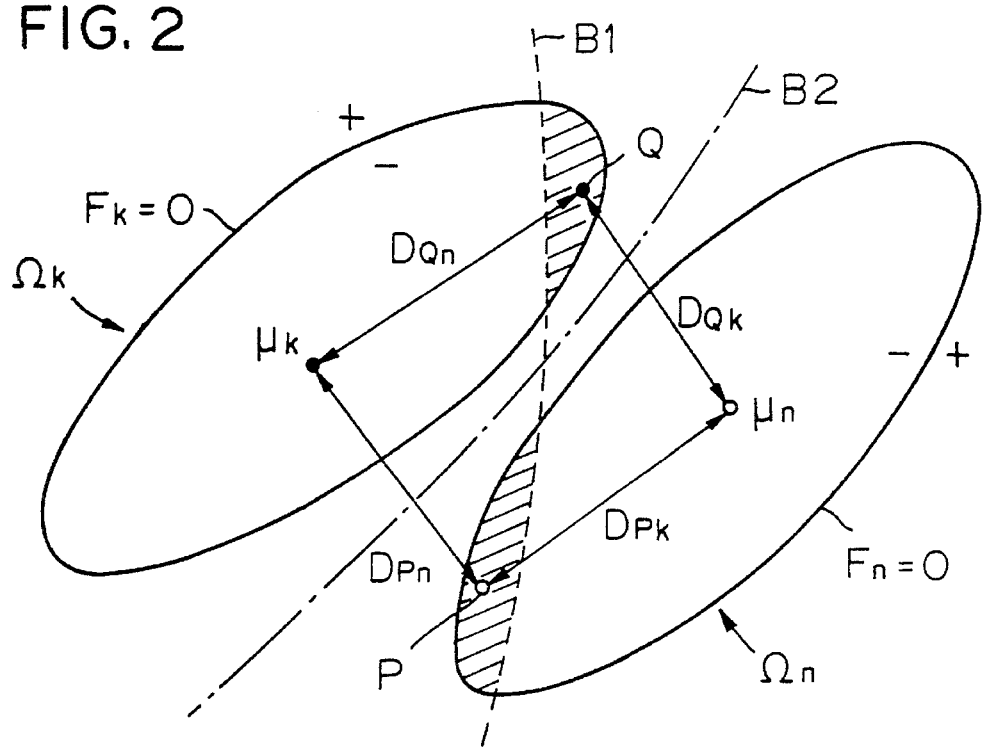
FIG. 2 is a schematic diagram showing the relationship between a training pattern set and a rival pattern set.

Now, let it be assumed that when patterns were discriminated using a proper distance function, a pattern P belonging to a class n is misread or misclassified as belonging to another class k and a pattern Q belonging to the class k as belonging to the class n as shown in FIG. 2. In this instance, letting the reference pattern vectors of the classes k and n be represented by $\mu_k$ and $\mu_n$, the distances between the feature vector of the pattern P and the reference pattern vectors $\mu_k$ and $\mu_n$ by $D_{Pk}$ and $D_{Pn}$ and the distances between the feature vector of the pattern Q and the reference vectors $\mu_k$ and $\mu_n$ by $D_{Qk}$ and $D_{Qn}$, the distances $D_{Pk}$ and $D_{Qn}$ are smaller than those $D_{Pn}$ and $D_{Qk}$, respectively; hence, the patterns P and Q are misclassified. To relieve the misread patterns P and Q, it is necessary to correct or modify the distances so that $D_{Pk}$ and $D_{Qn}$ become larger and $D_{Pn}$ and $D_{Qk}$ smaller. To this end, functions $F_k$ and $F_n$, which have values negative for patterns belonging to the noticed class and positive for patterns not belonging to the noticed class, are calculated for the classes k and n as shown in FIG. 2 and such functions are added to the respective distances.

According to the present invention, the discriminant function is obtained by making a discriminant analysis between a set of patterns of each class and a set of patterns either misclassified or nearly misclassified as belonging to the class (which will hereinafter be referred to as a rival pattern set and the nearly misclassified patterns as near-miss patterns). A concrete description will be given of the case where the weighted Euclidean distance, polynomial discriminant function (Bayesian discriminant function), modified quadratic discriminant function (and the projected distance) or the like is used as the original distance function D(x). In the following description, $x=(x_1, \ldots, x_M)^t$ represents the feature vector of each pattern, $\mu=(\mu_1, \ldots, \mu_M)^t$ represents the reference pattern vector of each class, and $\omega=(\omega_1, \ldots, \omega_M)^t$ is the inverse of the variance of the feature vector of a training pattern in each class and represents a weight vector.

The feature vectors of given training patterns are held in the feature vector holding part 19 for each class. t indicates a transposition and M the number of dimensions (or the number of components) of the feature vectors. Let D(x), F(x) and G(x) represent the original distance function, the discriminant function and the learning distance function, respectively. Furthermore, let the pattern set of the notice class be represented by $\Omega$ and the rival pattern set when discriminated with the original distance function D(x) be represented by $\Omega'$, and let it be assumed that the discriminant analysis is made between the pattern set $\Omega$ and the rival pattern set $\Omega'$. In the following description, the reference pattern vector, the weight vector, coefficients and a constant term, except the variable x, will be generically called parameters.

(1) Weighted Euclidean distance

The weighted Euclidean distance is expressed by the following expression.

$$D(x)=\Sigma \omega_m(x_m-\mu_m)^2 \quad (2)$$

where
$\Sigma$ represents $$\sum_{m=1}^{M}$$

If all the weights $\omega_1, \ldots, \omega_M$ are 1's, D(x) is the Euclidean distance. In the original dictionary 14 there are stored the reference pattern vector $\mu$ and weight vector $\omega$ of each class. According to the present invention, the discriminant function F(x) is obtained, with two variables $y_m$ and $y_{m+M}$ defined as follows:

$$y_m=(x_m-\mu_m)^2$$

$$y_{m+M}=(x_m-\mu_m) \quad (3)$$

That is, both the difference between each component $x_m$ of the feature vector of the training pattern and the corresponding component $\mu_m$ of the reference pattern vector and the square of the difference are used as variables. Hence, the discriminant function F(x) is defined as follows:

$$\begin{aligned} F(x) &= \Sigma a_m y_m + \Sigma b_m y_{M+m} + c \\ &= \Sigma a_m(x_m-\mu_m)^2 + \Sigma b_m(x_m-\mu_m) + c \end{aligned} \quad (4)$$

where
$\Sigma$ represents $$\sum_{m=1}^{M}$$

In this instance, the signs of the coefficient parameters $\{a_m\}$, $\{b_m\}$ and c are determined so that the value of the discriminant function F(x) is negative or positive depending on whether x belongs to the noticed class or the rival pattern set. In the discriminant dictionary 16, the coefficient parameters $\{a_m\}$, $\{b_m\}$ and c are stored for each class. A concrete method for obtaining these coefficients will be described later on.

(2) Polynomial discriminant function (Bayesian discriminant function)

Letting S represent a covariance matrix of feature vectors in the noticed class and $\phi_m$ and $\lambda_m$ represent the m-th eigenvector and eigenvalue of the covariance matrix S, the Bayesian discriminant function D(x) can be expressed as follows:

$$\begin{aligned} D(x) &= (x-\mu)^t S^{-1}(x-\mu) + \ln|S| \\ &= \Sigma\{\phi_m^t(x-\mu)\}^2/\lambda_m + \ln|S| \end{aligned} \quad (5)$$

where
$\Sigma$ represents $$\sum_{m=1}^{M}$$

In this case, $\mu$, $(\phi_1, \ldots, \phi_M)$, $(\lambda_1, \ldots, \lambda_M)$ and $\ln|S|$ are stored in the original dictionary 14 for each class. If the constant term $\ln|S|$ is neglected, then a Mahalanobis distance will be provided. The discriminant function F(x) is calculated, with the two variables $y_m$ and $y_{M+m}$ defined as follows:

$$y_m=\{\phi_m^t(x-\mu)\}^2$$

$$y_{M+m}=\phi_m^t(x-\mu) \quad (6)$$

That is, each component of a vector, which is obtained by projecting a vector of the difference between the feature vector of the training pattern and the reference pattern vector into a subspace using the vector $(\phi_1, \ldots, \phi_M)$, and the square of the above-said component are used as variables. The function F(x) is given by the following equation.

$$F(x)=\Sigma a_m\{\phi_m^t(x-\mu)\}^2+\Sigma b_m\{\phi_m^t(x-\mu)\}+c \quad (7)$$

where
$\Sigma$ represents $$\sum_{m=1}^{M}$$

In the discriminant dictionary 16, the parameters $\{a_m\}$, $\{b_m\}$ and c are stored for each class.

(3) Modified quadratic discriminant function and projected distance In this instance, D(x) is expressed as follows:

$$D(x)=\alpha[\|x-\mu\|^2-\Sigma\omega_u\{\phi_u^t(x-\mu)\}^2]+d \quad (8)$$

where
$\Sigma$ represents $$\sum_{m=1}^{T}$$

In the case of the modified quadratic discriminant function, T is the order at which the rate of cumulative contribution of eigenvalue exceeds a predetermined constant $\delta$ for the first time, and the eigenvalue above the (T+1)-th order is expressed by $\lambda_{T+1}$. Moreover, $$\alpha=1/\lambda_{T+1}$$

$$\omega_u=1-\lambda_{T+1}/\lambda_u$$

$$d=\ln(\Pi\lambda_u \cdot \Pi\lambda_{T+1})$$

where the first $\Pi$ in the brackets is the product of $\lambda$ from u=1 to u=T and the second $\Pi$ is the product of $\lambda$ from u=T+1 to u=M. In the original dictionary 14, the value of T, the parameters $\mu$, $(\phi_1, \ldots, \phi_T)$, $(\lambda_1, \ldots, \lambda_{T+1})$ and d are stored for each class. In the case where T is a predetermined constant and $\alpha=1$, $\omega_u=1$ and d=0, the distance is called "projected distance".

In the case of the modified quadratic discriminant function and the projected distance, the discriminant function F(x) is calculated after defining two variables $y_u$ and $y_{T+u}$ as follows:

$$y_u + \{\phi_u'(x-\mu)\}^2$$

$$y_{T+u} = \phi_u'(x-\mu) \quad (9)$$

where:

$u \leq T$

The discriminant function F(x) is given as follows:

$$F(x) = \Sigma a_u \{\phi_u'(x-\mu)\}^2 + \Sigma b_u \{\phi_u'(x-\mu)\} + c \quad (10)$$

wherein $\Sigma$ represents $$\sum_{u=1}^{T}$$

In the discriminant dictionary 16, the parameters $\{a_u\}$, $\{b_u\}$ and c are stored for each class.

The above description has been given of the weighted Euclidean distance, the quadratic discriminant function, the Mahalanobis distance, the modified quadratic discriminant function and the projected distance, and the concept of the present invention is similarly applicable to other distance functions, for instance, a city block distance.

Figure 3:
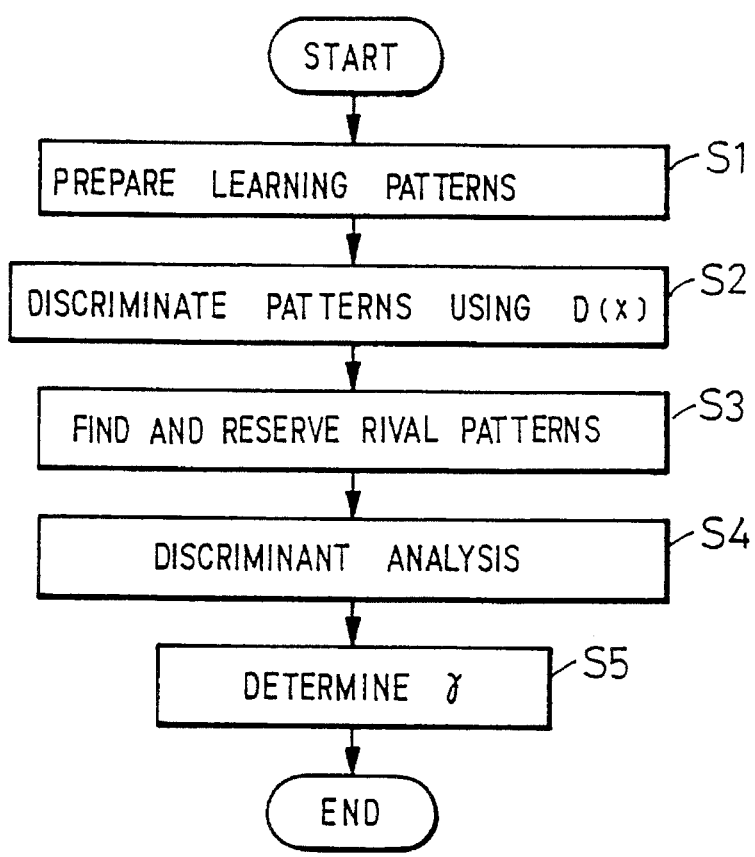
FIG. 3 is a flow chart showing the procedure for generating the dictionary for pattern recognition use.

FIG. 3 shows the procedure for obtaining the learned distance function G(x) by determining the coefficient parameters $\{a_m\}$, $\{b_m\}$ and c of respective variables in the discriminant function F(x) for each class and determining the coupling coefficient $\gamma$ of the discriminant function F(x) for the original distance function D(x). This procedure is common to the aforementioned weighted Euclidean distance, the quadratic discriminant function and the modified quadratic discriminant function.

The procedure begins with step S1 wherein a number of training patterns are prepared for every class and their feature vectors are extracted and then stored in the feature vector holding part 19 for each class. In step S2 the mean of the feature vectors of the training patterns of each class is extracted as the reference pattern vector and the training patterns of all the classes are each recognized or classified using the original distance function D(x). That is, the distance between the feature vector of each training pattern and the reference pattern vector of each class is calculated using the original distance function D(x) and the class closest to the feature vector is regarded as a class to which the training pattern belongs. In step S3 rival patterns for each class are compiled on the basis of the classified results of all the training patterns. The rival patterns are obtained by selecting for each noticed class, patterns misclassified and nearly misclassified as belonging to the noticed class although they belong to the other classes. The near-miss patterns can be obtained by selecting those patterns belonging to classes other than the noticed one and correctly classified as belonging to their classes for which the differences between the distance from the reference pattern vector of the noticed class and the distance from the reference pattern vectors of the classes to which the patterns belong are within a predetermined value, or by selecting a predetermined number of patterns in increasing order of the difference between the distance from the reference pattern vector of the noticed class and the distance from the reference pattern vector of each class to which the patterns belong. That is, the near-miss pattern is a pattern which is correctly classified but is very likely to be misclassified as belonging to the currently notice class in the event of a slight change in the distance between the noticed class and the class to which the pattern belongs, because there is substantially no difference between the distance from the former and the distance from the latter. The number of near-miss patterns for each class is chosen to be, for instance, about three times larger than the number of misread patterns for the class. The rival pattern set thus obtained for each class is stored in the rival pattern holding part 18.

Next, in step S4 a discriminant analysis is made between all training patterns of each class and the rival patterns of the corresponding set to thereby determine the coefficient parameters $\{a_m\}$, $\{b_m\}$ and c of the discriminant function F(x). This function is determined following the procedure described below. Now, let $S_s$ represent a covariance matrix concerning a vector $y=(y_1, \ldots, y_M, y_{M+1}, \ldots, y_{2M})$ which uses, as its components, the aforementioned two coefficients $y_m$ and $y_{M=m}$ of a pattern set (letting the number of patterns which form the set be represented by $n_s$) belonging to each class, and let $S_R$ represent a covariance matrix of the feature vectors of the rival pattern set (letting the number of patterns forming the set be represented by $n_R$) corresponding to the said each class. A matrix S is calculated by the following equation.

$$S = q_S S_S + q_R S_R \quad (11)$$

$$q_S = n_S/(n_S + n_R)$$

$$q_R = n_R/(n_S + n_R)$$

The number of misread patterns that are obtained as rival patterns for each class is originally small and the accuracy of the covariance matrix cannot be increased sufficiently high with the misread patterns alone. In this embodiment, the number of rival patterns is increased by using the near-miss or nearly-misread patterns as well, but according to the principles of the present invention, the nearly-misread patterns need not always be used. $q_S$ and $q_R$ may both be set to 0.5. Next, a vector $e=(a_1, \ldots, a_M, b_1, \ldots, b_M)^t$ is defined which uses the two coefficients $a_m$ and $b_m$ as its components and e and c are calculated by the following equation, using means $y_S$ and $y_R$ of a vector y which uses the coefficients $y_m$ and $y_{M+m}$ of the pattern set and rival pattern set of each class.

$$e = S^{-1}(y_R - y_S)$$

$$c = (\tfrac{1}{2})e^t(y_R + y_S) \quad (12)$$

In this way, the discriminant function F(x) in the learned distance function G(x) is determined.

Figure 4:
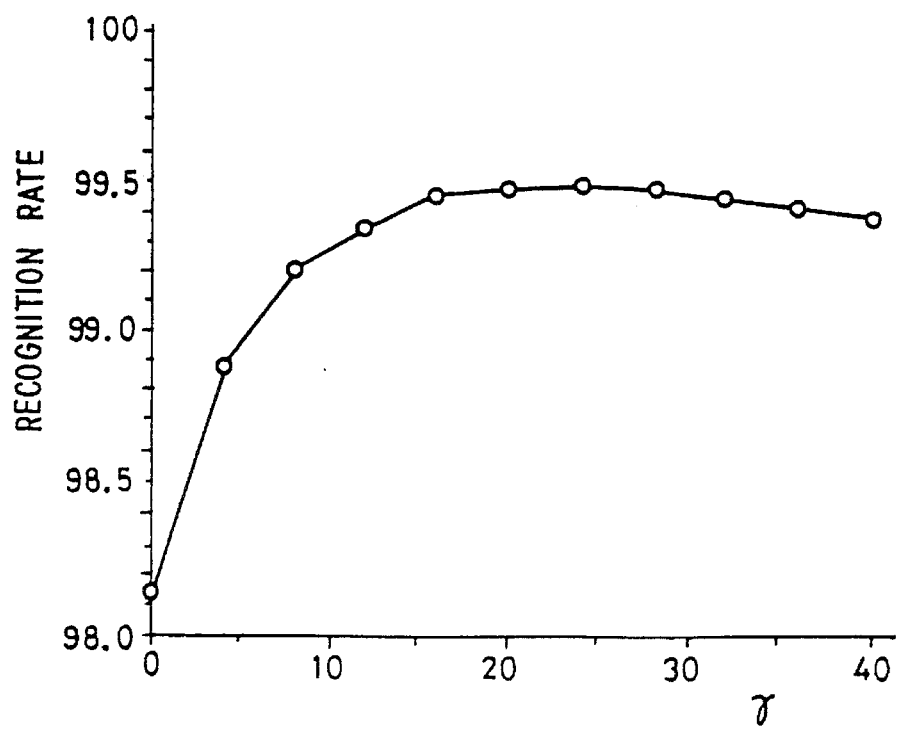
FIG. 4 is a graph showing the relationship between a coupling coefficient γ and the recognition rate.

Next, an optimum value of the coupling coefficient $\gamma$ is determined in step S5. As shown in FIG. 4, according to experiments by the inventors of this application, the recognition rate based on Eq. (1) rapidly increases with an increase in the coupling coefficient $\gamma$ and reaches the maximum at a certain value of the coefficient $\gamma$, thereafter gradually decreasing. Based on this fact, the value of the coupling coefficient $\gamma$ is increased step by step from its initial value 0 by a fixed width and, for each value of the coefficient $\gamma$, all training patterns of all classes are discriminated on the basis of the learned distance function G(x) of Eq. (1) and the recognition rate for the entire training patterns by the coupling coefficient $\gamma$ is calculated. In this way, the recognition rate varies with the change in the coupling coefficient $\gamma$ and the value of the coefficient $\gamma$ is determined which provides the maximum recognition rate.

In the above-described fashion, the discriminant function F(x) and the coupling coefficient $\gamma$ are determined, and consequently Eq. (1) is determined which defines the learned distance function G(x). The coefficient parameters $\{a_m\}$, $\{b_m\}$ and c thus determined for each class are written as dictionary data into the discriminant dictionary 16 in correspondence to the class. The value of the coupling coefficient $\gamma$ is also held in the discriminant dictionary 16. Since the parameters $\mu$ and $\omega$ stored in the original dictionary 14 and the parameters $\gamma$, $\{a_m\}$, $\{b_m\}$ and c in the discriminant dictionary 16 for each class are dictionary data which define the learned distance function G(x) for the class, the dictionaries 14 and 16 which holds these parameters will hereinafter be called, in combination, a dictionary G(x) as well.

Figure 5:
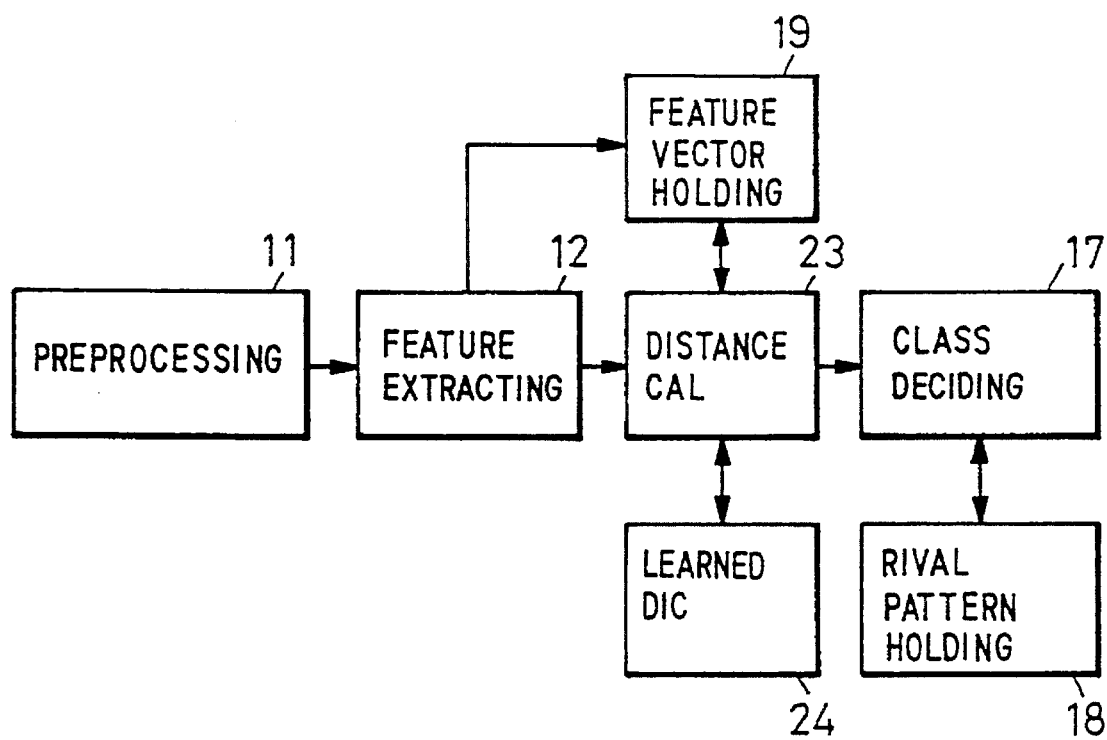
FIG. 5 is a block diagram illustrating another embodiment of the present invention for generating the dictionary for pattern recognition use and for pattern recognition.

To discriminate or recognize an arbitrary input pattern, the input pattern is preprocessed by the preprocessing part 11 to normalize the pattern size, for instance, then the feature vector of the normalized input pattern is extracted in the feature pattern extracting part 12, and in the distance calculating part 13 the weighted Euclidean distance D(x) is calculated by Eq. (2), for instance, using the reference pattern vector $\mu$ and weight vector $\omega$ of each class read out of the original dictionary 14. Next, in the discriminant value calculating part 15, the value of the discriminant function F(x) is calculated by Eqs. (3) and (4), using the coupling coefficient $\gamma$ and the coefficient parameters $\{a_m\}$, $\{b_m\}$ and c of each class read out of the discriminant dictionary 16, and the value of the learned distance function G(x) is calculated using the above-mentioned original distance function D(x) and Eq. (1). After this, in the class determining part 17 that one of the classes which provide the smallest one of the distance values G(x) of all classes thus obtained is selected and the selected class is output as the discriminated result. In the recognition of an arbitrary input pattern, the rival pattern holding parts 18 in FIGS. 1 and 5 are not necessary.

Incidentally, in the case of the weighted Euclidean distance, the learned distance function G(x) of Eq. (1) can be expressed by the following equation, using Eqs. (2) and (4).

$$G(x) = \Sigma \omega_m'(x_m - \mu_m')^2 + d \tag{13}$$

where $$\omega_m' = \omega_m + \gamma a_m \tag{13a}$$

$$\mu_m' = \mu_m - (1/2)\gamma b_m/\omega_m' \tag{13b}$$

$$d = \gamma c - (1/4)\Sigma(\gamma b_m)^2/\omega_m' \tag{13c}$$

where $\Sigma$ represents $$\sum_{m=1}^{M}$$

As is evident from Eqs. (13a), (13b) and (13c), parameters $\omega_m'$, $\mu_m'$ and d are constants, which can be precalculated using the function F(x) and the coupling coefficient $\gamma$ determined for each class as described above. Consequently, the original dictionary 14 and the discriminant dictionary 16 provided separately in FIG. 1 may be replaced by with a learned dictionary 24 as depicted in FIG. 5. In this instance, the parameters $\mu'=(\mu_1', \ldots, \mu_M')^t$, $\omega'=(\omega_1', \ldots, \omega_M')^t$ and d, which define the function G(x) for each class, are prestored as dictionary data in the dictionary 24, and the parameters $\mu'$, $\omega'$ and d are read out therefrom for the input pattern to calculate Eq. (13) in a distance calculating part 23. The dictionary 24 will hereinafter be referred to also as G(x).

Similarly, in the case of the quadratic discriminant function (or the Bayesian discriminant function), too, the learned distance function G(x) of Eq. (1) can be expressed by the following equation, using Eqs. (5) and (7)

$$\begin{aligned} G(x) &= \Sigma\{\phi_m^t(x-\mu)\}^2/\lambda_m + \ln|S| + \\ &\quad \gamma\Sigma a_m\{\phi_m^t(x-\mu)\}^2 + \\ &\quad \gamma\Sigma b_m\{\phi_m^t(x-\mu)\} + \gamma c \\ &= \Sigma\omega_m'\{\phi_m^t(x-\mu')\} + d \end{aligned} \tag{14}$$

where:

$$\omega_m' = 1/\gamma_m + \gamma a_m \tag{14a}$$

$$\mu' = \mu - (A)^{-1}z \tag{14b}$$

$$d = \ln|S| + \gamma c - (1/4)\Sigma(\gamma b_m)^2/\omega_m' \tag{14c}$$

$$z = (z_1, \ldots, z_M)^t$$

$$z_m = (1/2)\gamma b_m/\omega_m'$$

A: matrix using $\phi_m$ as row elements
where
$\Sigma$ represents $$\sum_{m=1}^{M}$$

Also in this case, the system configuration shown in FIG. 5 can be employed, and the learned dictionary 24 needs only to prestore parameters $(\phi_1, \ldots, \phi_M)$, $\mu'=(\mu_1', \ldots, \mu_M')^t$, $\omega'=(\omega_1', \ldots, \omega_M')^t$ and d for each class.

In the case of the modified quadratic discriminant function and the projected distance, the learned distance function G(x) of Eq. (1) can be expressed by the following equation on the basis of Eqs. (8) and (10).

$$\begin{aligned} G(x) &= \alpha[\|x-\mu\|^2 - \Sigma\omega_u\{\phi_u^t(x-\mu)\}^2] + d + \\ &\quad \gamma\Sigma a_u\{\phi_u^t(x-\mu)\}^2 + \\ &\quad \gamma\Sigma b_u\{\phi_u^t(x-\mu)\} + \gamma c \\ &= \alpha[\|x-\mu'\|^2 - \Sigma\omega_u'\{\phi_u^t(x-\mu')\}^2] + d' \end{aligned} \tag{15}$$

where:

$$\omega_u' = \omega_u - \gamma a_u/\alpha \tag{15a}$$

$$\mu' \mu - (A)^{-1}z \tag{15b}$$

$$d' = d + \gamma c - (1/4)\Sigma(\gamma b_u)^2/(\alpha - \alpha\omega_u + \alpha a_u) \tag{15c}$$

$$z = (z_1, \ldots, z_M)^t$$

$$z_u = (1/2)\gamma b_u/(\alpha - \alpha\omega_u + \gamma a_u) \text{ if } u \leq T = 0$$

otherwise
where
$\Sigma$ represents $$\sum_{u=1}^{T}$$

In this instance, the learned dictionary 24 in FIG. 5 needs only to prestore the parameters $\alpha$, $(\phi_1, \ldots, \phi_T)$, $\mu'=(\mu_1', \ldots, \mu_M')^t$, $\omega'=(\omega_1', \ldots, \omega_T')^t$ and d' for each class.

For example, in the case of the weighted Euclidean distance, as is evident from comparison with Eq. (2), Eq. (13) is identical in shape with Eq. (2) except that the constant term d is added and the weight vector $\omega_m$ and the reference pattern vector $\mu_m$ are modified as shown in Eqs. (13a) and (13b), respectively. This means that Eq. (2) is modified to Eq. (13) as the result of learning on the boundary between the training pattern set and the corresponding rival pattern set for each class by a discriminant analysis (the F(x) determining process) between the two pattern sets. Turning back to FIG. 2, this will be described conceptually. In the pattern recognition based on the Eq. (2), the class boundary between training pattern groups $\Omega_k$ and $\Omega_n$ of two classes, for example, is drawn as indicated by the broken line B1, and consequently, the patterns P and Q in the shaded areas are each misclassified as belonging to the other class. According to the present invention, however, the discriminant function F(x) is determined by a discriminant analysis for each class and is added to the distance function D(x), in consequence of which such a modification or correction as mentioned above is made and the class boundary is corrected accordingly as indicated by the broken line B2, enabling the patterns P and Q to be correctly recognized.

Figure 6:
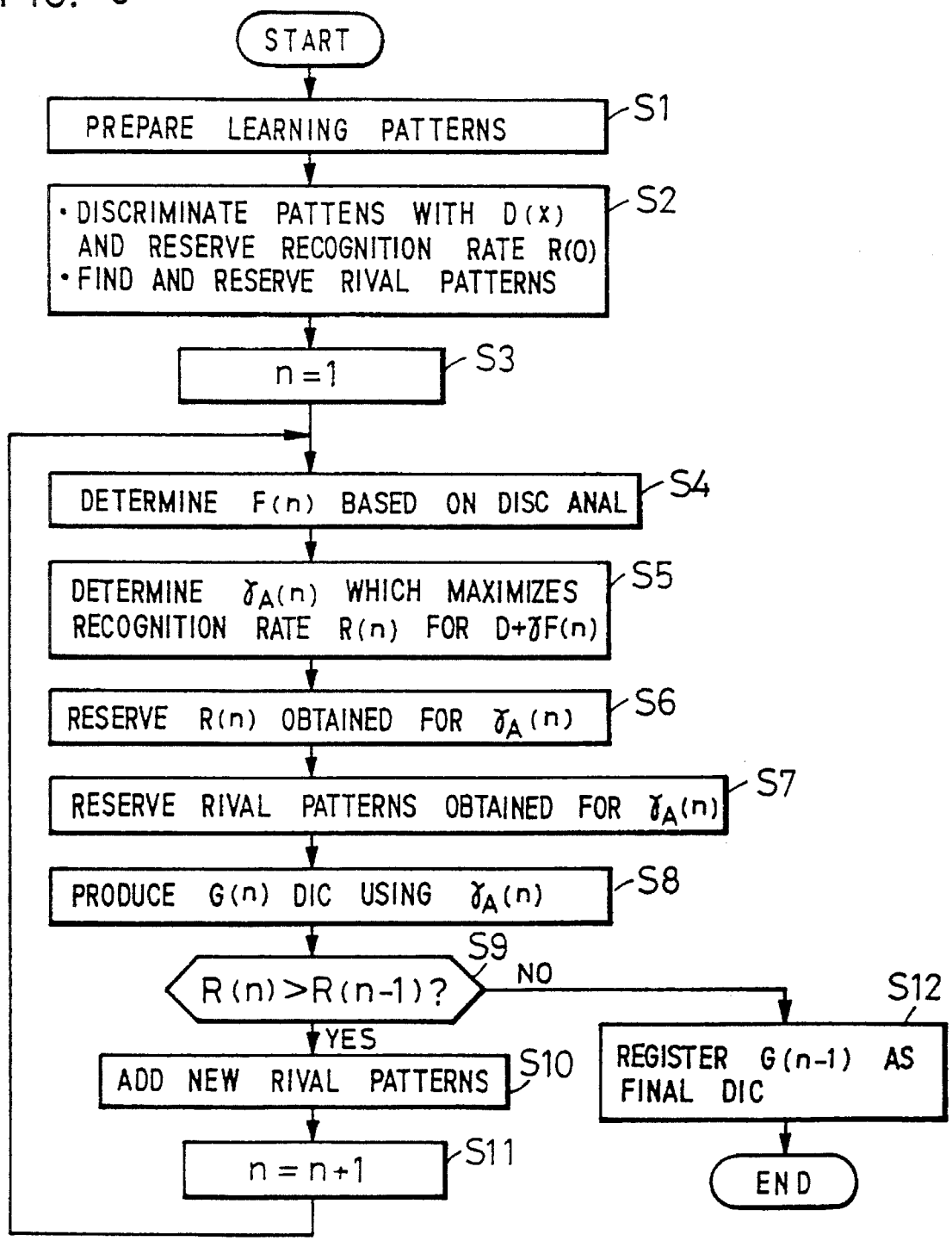
FIG. 6 is a flow chart showing the procedure for generating the dictionary for repetitive or iterative learning.

Eq. (13) indicates that further modification could be made by adding a new pattern to the training pattern set and/or rival pattern set of each class and making a discriminant analysis with the function F(x) (i.e. by learning). The same goes for Eq. (14) in the case of the quadratic discriminant function and Eq. (15) in the case of the modified quadratic discriminant function. FIG. 6 shows a flowchart for processing to provide increased recognition rate by correcting the learned distance function G(x) of Eqs. (13), (14) and (15) through learning.

In FIG. 6, steps S1 through S5 are the same as steps S1 through S5 in the FIG. 3 embodiment. In step S2 all training patterns are discriminated with the discriminant function D(x), using the feature vectors of all the training patterns prepared for each class in step S1 and the recognition rate R(0) calculated and is then held. Furthermore, rival patterns are compiled for each class and held in the rival pattern holding part 18. In step S3 the learning repetition count n is set to 1 and in step S4 a discriminant analysis is made between the training pattern set and the rival pattern set for each class, thereby determining the discriminant function F(x) for each class. In the following description, the indication of the variable x of each function will be omitted but instead the repetition count n, which indicates the session count or round number of learning, will be put in parentheses of the function. In step S5 the coupling coefficient γ is determined so that the recognition rate R(n) becomes maximum for all training patterns with the learning distance function G(n)=D+γF(n), and the value of this coupling coefficient is represented by $\gamma_A(n)$. The procedure for determining this value will be described in detail later on.

In step S6 all the training patterns are recognized with the learned distance function G(n) using the above-noted value $\gamma_A(n)$ determined in step S5 and the recognition rate R(n) based on the discriminated results is held, after which the rival patterns are detected on the basis of the discriminated results and is held. In step S8, in the case of the FIG. 1 system configuration, the coefficient parameters $\{a_m\}$, $\{b_m\}$ and c of the discriminant function F(n) of, for example, Eq. (4) determined in step S4 are stored as dictionary data in the discriminant dictionary 16 in correspondence to each class. In the case of the FIG. 5 system configuration, for example, the parameter vectors μ'(n), ω'(n) and d, expressed by Eqs. (13a), (13b) and (13c), are calculated for each class, using the coefficient of the discriminant function F(x) determined in step S4 and the value $\gamma_A(n)$ determined in step S5, and the thus calculated parameter vectors are written as dictionary data into the learned dictionary 24 to update its contents.

In step S9 a check is made to see if the recognition rate R(n) obtained in step S6 is higher than the previous recognition rate R(n−1). If so, it means that the learning effect was produced, and it can be expected to further enhance the recognition rate by further learning. Then, the process proceeds to step S10, in which new rival patterns contained in the rival pattern set obtained for each class by the discrimination with the function G(n) in step S7, for instance, are added to the rival pattern (held in the rival pattern holding part 18) obtained for each class by the discrimination with the functions D, G(1), . . . , G(n−1) in step S2. Next, in step S11 the learning repetition count n is incremented by one and the process goes back to step S4, in which the updated rival pattern set is used to make the discriminant analysis again to update the function F(n), after which the same processing is repeated. If it is found in step S9 that the recognition rate R(n) is not higher than that of the previous recognition, no further improvement of the recognition rate can be expected, and consequently, the process proceeds to step S12, in which the parameters defining the previous learned distance function G(n−1) for each class are written into the dictionary 16 in FIG. 1 or dictionary 24 in FIG. 5 and then this session of learning ends. Thus, the value $\gamma_A(n-1)$ in the previous recognition in which the recognition rate was the maximum is stored as an eventual value of the coupling coefficient γ.

Figure 7:
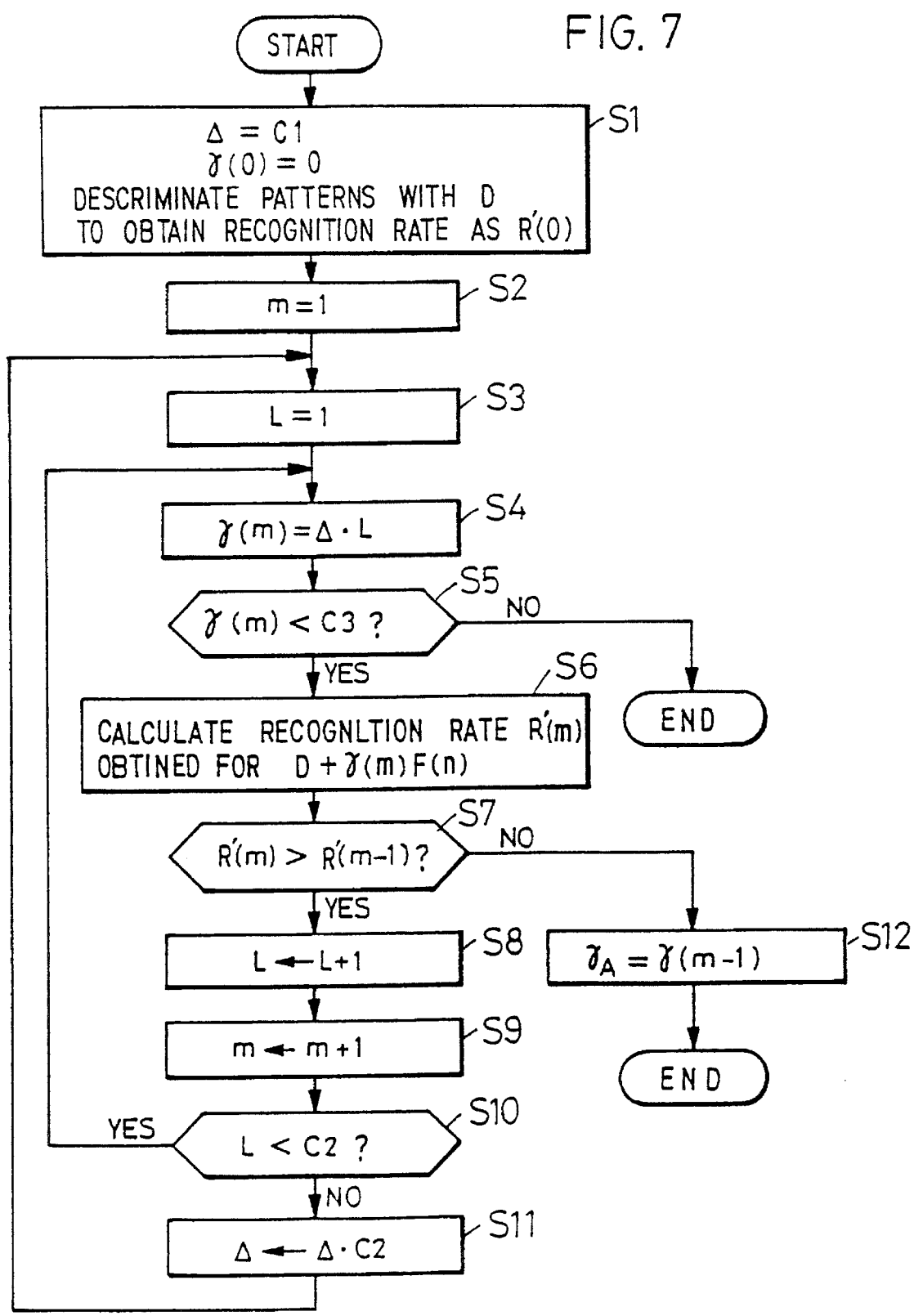
FIG. 7 is a flow chart showing the procedure for determining $\gamma_A$ in step S5 in FIG. 6.

FIG. 7 shows in detail the procedure for determining the coupling coefficient $\gamma_A$ (hereinafter identified simply as γ) in step S5 in the FIG. 6 flowchart. The number of repetitions of this coupling coefficient determination processing is represented by m. In step S1 the step width Δ of the coupling coefficient γ is set to a predetermined value C1 (C1=100, for instance), and the initial value R'(0) of a temporary recognition rate R'(m) is set to the recognition rate obtained when recognition was made with the original distance function D, and the initial value γ(0) of the coupling coefficient is set to 0. In step S2 the repetition count m is set to m=1; in step S3 the loop count L is set to L=1; and in step S4 the value of the coefficient γ(m) of the current session (m=1) is set to γ(m)=Δ·L. Next, in step S5 it is made sure that the coefficient γ(m) does not reach its upper limit value C3 ($10^8$, for instance), after which the process proceeds to step S6, in which all patterns are discriminated with the learning distance function G using the coefficient γ(m) and the recognition rate R'(m) is calculated. In step S7 a check is made to see if the recognition rate R'(m) is larger than the previous one R'(m−1). If so, there is the possibility of the maximum recognition rate having not been reached yet. Therefore, in step S8 the loop count L is incremented by 1; in step S9 the repetition count m is also incremented by 1; and in step S10 a check is made to see if the loop count L is smaller than a predetermined count C2 (C2=100, for instance). If it is smaller than C2, then the process returns to step S4. If it is found in step S10 that the loop count L has reached the predetermined count C2, the process goes to step S11, in which the step width Δ is made C2 times larger than that set so far (i.e. Δ←Δ·C2). After this, the process returns to step S3, in which the loop count L is reset to 1 and the same processing as described above takes place. When it is found in step S7 that the recognition rate R'(m) is not larger than the previous one, it is judged that the recognition rate will no longer increase, and in step S12 the coupling coefficient γ(m−1) in the previous session is determined as the value of the coupling coefficient $\gamma_A$ and this session ends.

In the FIG. 6 embodiment, when learning is repeated, the coupling coefficient $\gamma_A$ is set which maximizes the recognition rate and the new rival patterns obtained as the result of recognition are added to the previous rival patterns and then the discriminant analysis is made again. It has been found experimentally, however, that the effect of improving the ultimate recognition rate by learning of G(x) would increase when the value of the temporary coupling coefficient $\gamma$ in step S5 in the course of learning of G(x) is selected to be a little larger than the value $\gamma_A$ which maximizes the recognition rate (hence, the recognition rate in this case would be smaller than the maximum value). This is considered to be for the reasons given below. When the value $\gamma_A$ is determined in step S5 so that the recognition rate become maximum, the number of new rival patterns which are generated in the pattern recognition using the value $\gamma_A$ in step S6 abruptly decreases, and consequently, the number of rival patterns obtained for each class at the end of learning of G(x) is not sufficiently large and the covariance matrix of the rival pattern set cannot be obtained with high accuracy.

Figure 8:
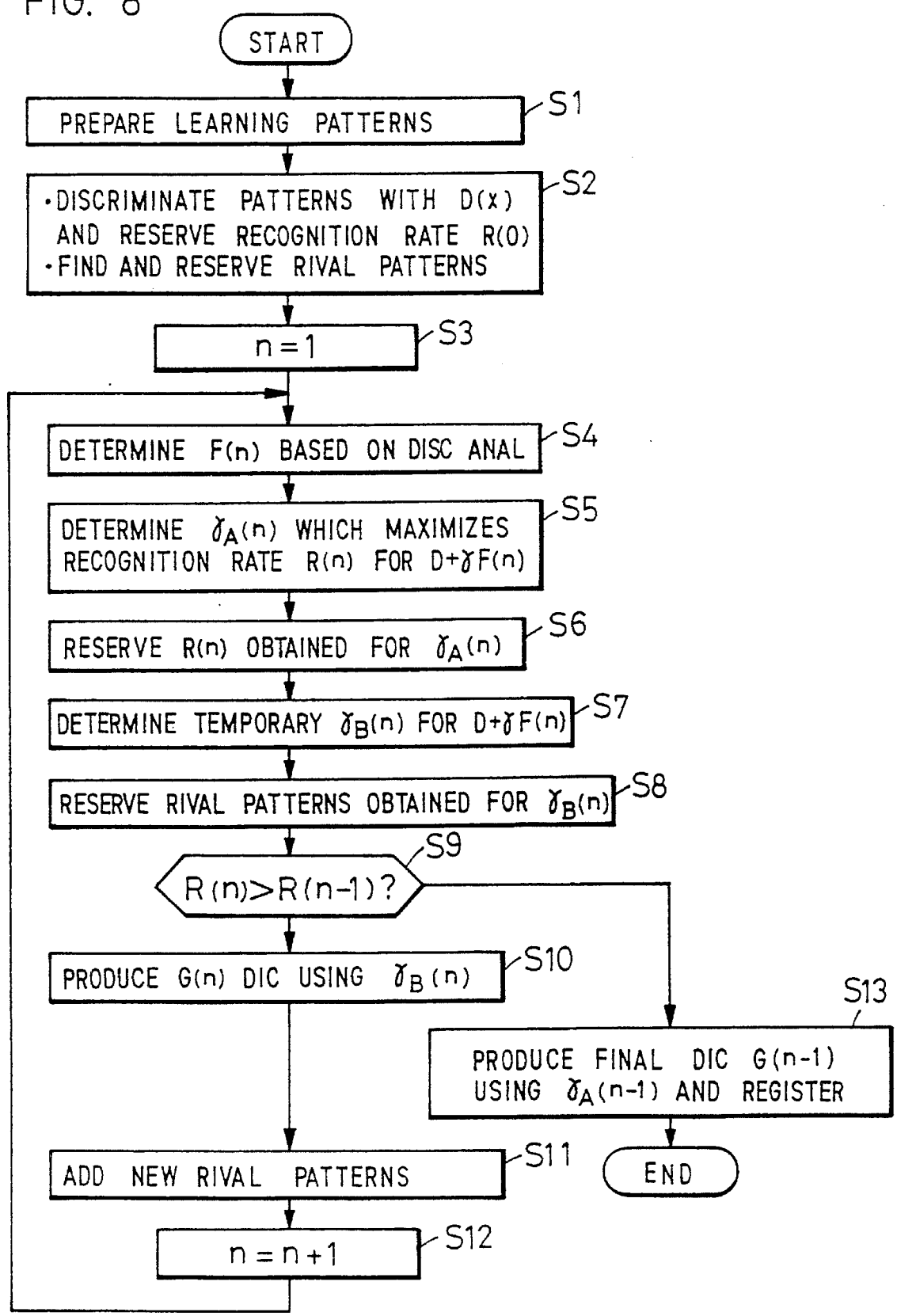
FIG. 8 is a flow chart showing the procedure for generating another dictionary for repetitive learning.

By temporarily selecting in step S5 the coupling coefficient $\gamma$ to be a value $\gamma_B$ larger than that which maximizes the recognition rate so as to heighten the learning effect, it is possible to intentionally increase the number of new rival patterns which are generated in the discrimination processing in step S6. This increases the number of new rival patterns which are added to the rival pattern set in step S10, making it possible to obtain a highly accurate covariance matrix. In FIG. 8 there is shown a flow chart for the procedure of generating a dictionary through learning based on such a concept as mentioned above.

The contents of steps S1 through S6 are the same as those in the FIG. 6 embodiment. Also in this embodiment, the coupling coefficient $\gamma_A(n)$ which maximizes the recognition rate R(n) is determined in step S5 following the procedure depicted in FIG. 7, and in step S6 the recognition rate R(n) with the function G(n) using the coupling coefficient $\gamma_A$ is calculated and is then held. In the next step S7, however, the coupling coefficient $\gamma$ is selected to be a value larger than that $\gamma_A$ which maximizes the recognition rate, determined in step S5. The criterion for selecting the value of the coupling coefficient $\gamma$ is such as described below. That is, the coupling coefficient $\gamma$ is set to the value $\gamma_B$ such that the number of rival patterns of any one of the class exceeds a predetermined value when new rival patterns, which result from the pattern recognition of all patterns on the basis of the function G(n) using the selected coupling coefficient $\gamma$, are added to the rival pattern set previously obtained with the original distance function D and held in the rival pattern holding part 18.

Next, in step S8 the rival patterns based on the results of the pattern recognition with the coupling coefficient $\gamma_B$ determined in step S7 are held in the rival pattern holding part 18, and in step S9 it is determined if the recognition rate R(n) by the pattern recognition in step S7 is larger than the previous one. If so, the process proceeds to step S10, in which dictionary data based on the function G(n) using the coupling coefficient $\gamma_B$, that is, the parameters $\{a_m\}$, $\{b_m\}$, c and $\gamma$ in the case of the FIG. 1 embodiment, or the parameters $\mu'$, $\omega'$ and d' in the case of the FIG. 5 embodiment, are written into the dictionary 16 or 24 (to generate the dictionary G(x)). Then, in step S11 the newly generated rival patterns are added to the corresponding rival pattern set and in step S12 the learning repetition count n is incremented by 1, after which the process returns to step S4. When it is found in step S9 that the current recognition rate R(n) is not larger than the previous rate R(n−1), the process proceeds to step S13, in which dictionary data based on the learned distance function G(n−1) using the value $\gamma_A(n-1)$ Of the coupling coefficient $\gamma$ which maximizes the previous recognition rate is written into the dictionary 16 or 24 and this session of learning ends.

To sum up, in the FIG. 8 embodiment, flow repeats determining the value $\gamma_A$ of the coupling coefficient $\gamma$ which maximizes the recognition rate, selecting, as the temporary value $\gamma_B$ for learning the dictionary G, a value larger than that $\gamma_A$ and updating (i.e. learning) the dictionary, and when the recognition rate no longer exceeds the previous value, the repetition of learning ends, followed by the generation of a dictionary based on the learned distance function G(n−1) using the previous value $\gamma_A$ which maximizes the recognition rate, and then flow ends. In the procedure of FIG. 8, the decision step S9 may be shifted to between steps S6 and S7.

Figure 9:
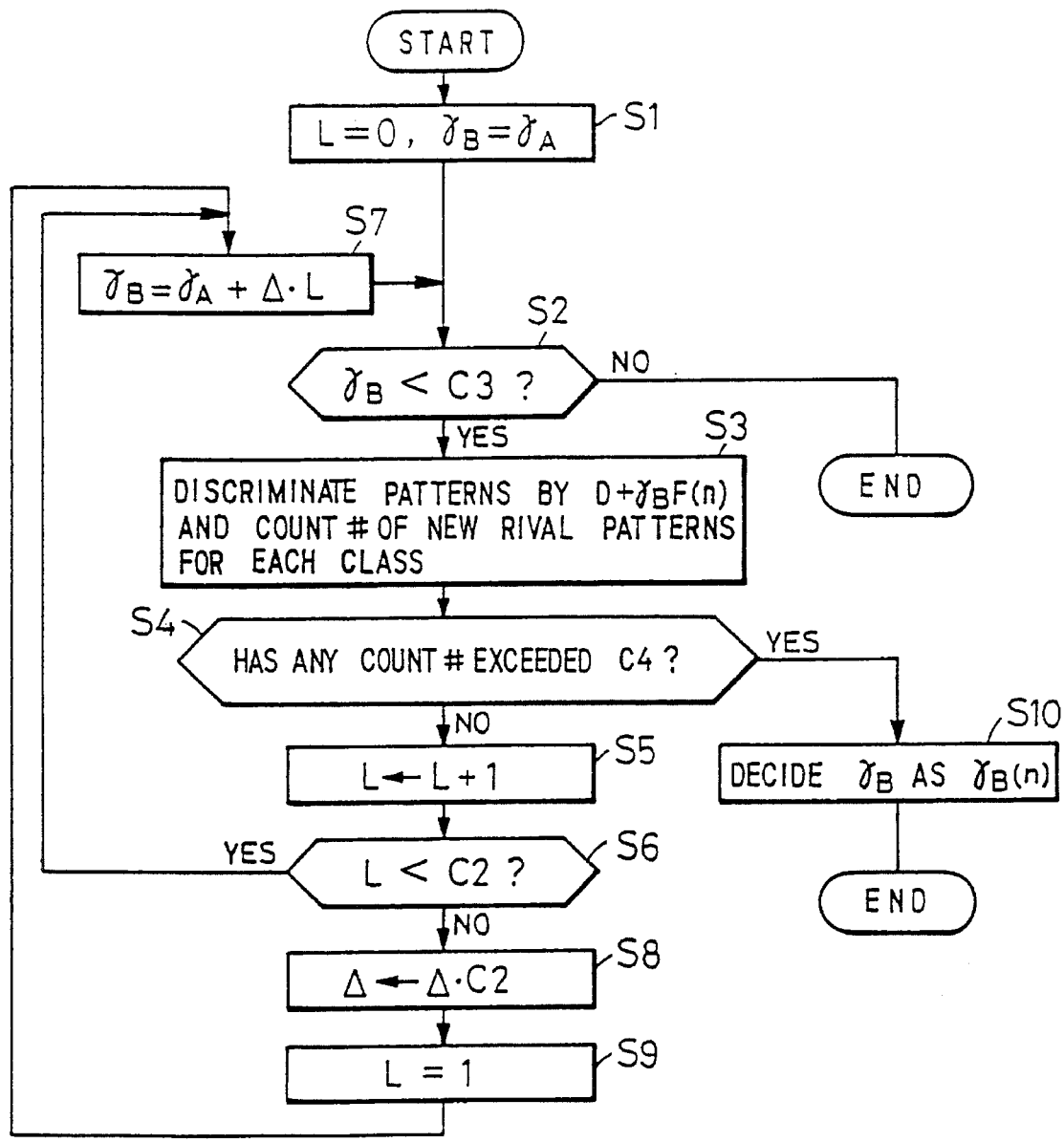
FIG. 9 is a flow chart showing the procedure for determining $\gamma_B$ in step S7 in FIG. 8.

FIG. 9 shows an example of the procedure for determining the value $\gamma_B$ larger than that $\gamma_A$ in step S7. In step S1 the initial value of the coupling coefficient $\gamma_B$ is set to $\gamma_A$, then in step S2 it is made sure that the value $\gamma_B$ is smaller than a predetermined limit value C3, and in step S3 a pattern recognition based on G(n) using the value $\gamma_B$ is performed to obtain rival patterns for each class and the number of new rival patterns is counted. In step S4 a check is made to see if the number of new rival patterns for the class concerned is larger than a predetermined value C4 (400, for instance). When such a class is not found, flow proceeds to step S5, in which the loop count L is incremented by one, and then goes to step S6, in which a check is made to see if the loop count L has reached a predetermined value C2. If the loop count L is smaller than C2, flow goes to step S7, in which the value $\gamma_B$ is set to $\Delta \cdot L+\gamma_A$, and then goes back to step S2, repeating the same processing as mentioned above. Consequently, as long as the loop count L checked in step S6 is smaller than the value C2, the value $\gamma_B$ increases from the value $\gamma_A$ by a fixed width $\Delta$ in step S7 upon each iteration of the loop. When it is found in step S6 that the loop count L has reached the value C2, flow proceeds to step S8, in which the value of the width $\Delta$ is set to be C2 times larger than the previous value, that is, a value $C2 \cdot \Delta$ is set as a new step width $\Delta$, and goes to step S9, in which the loop count L is reset to L=1. Then, in step S7, the value $\gamma_B$ is set to $\gamma_A+\Delta \cdot L$, after which processing of step S2 and the subsequent steps is repeated. When it is found in step S4 that the number of rival patterns is larger than the value C4 in any class, the value $\gamma_B$ used for the pattern recognition in step S3 is determined as the value $\gamma_A$ that is to be determined in step S7 in FIG. 8.

In the embodiments of FIGS. 6 and 8, the entire training patterns are only initial ones and all the training patterns are subjected to the pattern recognition to obtain the rival pattern set which is used to determine the discriminant function F(x) for each class. In this instance, if the number of rival patterns for each class is not sufficiently large, the accuracy of the covariance matrix of the rival pattern set is low as referred to previously and it is likely to fail to increase the ultimate recognition rate even if learning of the dictionary G(x) is repeated. To avoid this, it is possible to employ such a method as described below. That is, some or all of the rival patterns of each class, obtained in step S3 of FIG. 3 or step S2 of FIG. 6 or 8, are variously modified into various new patterns by making their lines thick or thin if the rival patterns are character patterns, for instance, and these new patterns are discriminated using the original distance function D(x) for each class. Of the discriminated patterns, those judged as rival patterns of each class (hereinafter referred to as pseudo-rival patterns) are added to the rival pattern set of the class, after which the discriminant analysis in step S4 of FIG. 3, 6 or 8 is performed. Strictly speaking, in this case, the addition of the modified patterns to each class causes a change in the reference pattern vector of the class; hence, the accuracy of the discriminant analysis of step S4 in FIG. 3, 6 or 8 could be increased by performing the analysis after obtaining a new reference pattern vector for each class. It is also possible, however, to determine the discriminant function F(x) and the coupling coefficient γ by performing the analysis of step S4 in FIG. 3, 6 or 8 through utilization of the reference pattern vector prior to the addition of the new rival patterns to the rival pattern set of each class.

In the embodiments of FIGS. 6 and 8, learning is repeated for n=1, 2, . . . , the repetition of learning is finished when it is determined in step S9 that the recognition rate R(n) for all patterns of all classes will no longer increase, and the ultimate dictionary is determined on the basis of the dictionary G(n−1) using the ultimately determined optimum coupling coefficient $\gamma_A$. In practice, however, even if the recognition rate for the patterns of all classes is maximum, the recognition rates for the individual classes usually differ and do not always become maximum when the recognition rate for the patterns of all classes reaches its maximum value. That is, the recognition rate for a certain class may sometimes become maximum during the repetition of learning. It is considered possible to further increase the recognition rate as a whole by holding a temporary dictionary generated upon each repetition of learning, selecting one of the temporary dictionaries which maximizes the recognition rate for a corresponding one of the classes, and extracting and registering the function F(n) held in the selected dictionary for the class.

Figure 10:
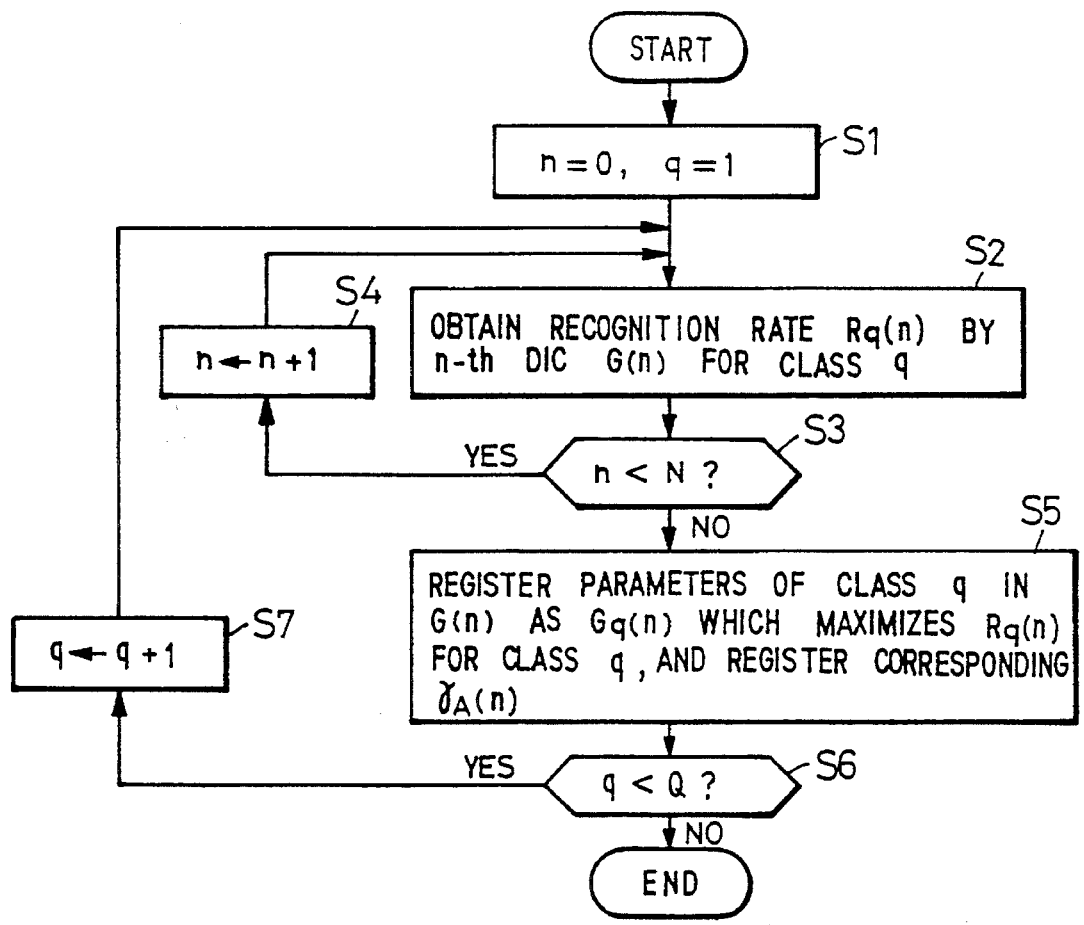
FIG. 10 is a flow chart illustrating a modified form of the FIG. 6 or 8 embodiment.

FIG. 10 shows an example of the procedure based on the above-noted idea. This procedure will be described as being applied to the FIG. 6 embodiment. Assume that in FIG. 6, the value of the coupling coefficient $\gamma_A(n)$, determined in step S5 upon each repetition of learning, is held and the dictionary G(n) set up in step S8 is held as a temporary dictionary. Let it be assumed that when the condition for making the recognition rate R(n) higher than the previous one is no longer satisfied in step S9, N+1 temporary dictionaries, including the case of n=0, are obtained. In this case, the procedure shown in FIG. 10 is performed in place of the processing of step S12 in FIG. 6.

Let q=1, 2, 3, . . . , Q represent the numbers of all classes and n=0, 1, . . . , N the numbers of temporary dictionaries. In step S1, the dictionary number n and the class number q are initialized to 0 and 1, respectively. Then, in step S2, the recognition rate $R_1(0)$ is first obtained for patterns of the class q=1, using the corresponding coupling coefficient $\gamma_A(0)$ based on the n=0th one G(0) of the N+1 dictionaries, that is, the original dictionary D, where $\gamma_A(0)$ is zero. When it is found in step S3 that the dictionary number n is not the last one N, it is incremented by one in step S4. Then, flow returns to step S2 to obtain the recognition rate $R_1(1)$ for the same class q=1, using the coupling coefficient $\gamma_A(1)$ based on the next dictionary G(1). Thereafter, the sequence of steps S2, S3 and S4 are similarly repeated, and when it is found in step S3 that the dictionary number n has reached the last one N, flow proceeds to step S5. At this time, there are provided, by the process of step S2, recognition rates $R_1(0), . . . , R_1(N)$ for the class q=1 by the N+1 sets of dictionary G and coupling coefficient $\gamma_A$. In step S5, a set of parameters, for example, $\mu$, $\omega$, $\{a_m\}$, $\{b_m\}$, c and $\gamma_A$, for the class q=1 in the dictionary G(n) which provide the maximum one of the N+1 recognition rates, are registered as ultimate dictionary data for the class q=1. Next, in step S6, if it is found that the class number q has not reached the last number Q, the class number q is incremented by one in step S7. Then, flow returns to step S2 and repeats the sequence of steps S2, S3 and S4 to perform the same processing as mentioned above, obtaining the recognition rate $R_2(n)$ for the class q=2 by each of the N+1 sets of dictionary and the coupling coefficient $\gamma_A$.

In step S5, dictionary data for the class q=2 in the dictionary which provides the maximum recognition rate for the class q=2 are registered as a dictionary $G_2(n)$ together with the corresponding coupling coefficient $\gamma_A(n)$. thereafter, steps S2 through S6 are repeated, by which dictionaries, which maximize the recognition rates for the respective Q classes, are ultimately selected and the dictionary data corresponding to each class is registered together with the corresponding coupling coefficient $\gamma_A$.

The method shown in FIG. 10 is applicable to step S13 in the FIG. 8 embodiment as well. In such an instance, the coupling coefficient $\gamma_A(n)$ is determined in step S6 in FIG. 8 and the dictionary G(n) is generated using the coupling coefficient $\gamma_A(n)$.

Incidentally, in the case of discriminating input patterns by use of the dictionary set up as described above, the learned distance function G(x) represented by Eq. (1) is used to select that one of the input patterns which is minimum in the distance between its feature vector and the reference pattern vector of each class. In this case, the equation which expresses the learned distance function G(x) contains the parameter γ which is the coupling coefficient for coupling the original distance function D(x) and the discriminant function F(x). By experimentation, it has been found that the parameter γ may have very large values of four through six digits according to the learning repetition count, the number of rival patterns and so forth. Consequently, floating-point operations are needed to calculate the learned distance function G(x)—this increases the computational quantity and decreases the processing speed. However, since learning samples (i.e. training patterns) are recognized using the original distance function D(x) and the discriminant function F(x) is defined so that misread or nearly-misread patterns, that is, rival patterns are correctly classified, it will be understood that the pattern recognition can be performed as briefly described below with reference to FIG. 1.

That is, in the distance calculating part 13, the distance D(x) between the feature vector of an arbitrary input pattern and each reference pattern vector is calculated by Eq. (2), (5), or (8), referring to the original dictionary 14 and a predetermined number of class candidates or those in a predetermined distance range are selected in increasing order of the distance. Then, in the discriminant value calculating part 15, the reference pattern vector of each class candidate and the feature vector of the input pattern are substituted in F(x) in Eq. (4), (7), or (10) and the discriminant dictionary 16 is referred to, to thereby obtain the value of the discriminant function F(x). The class which minimizes the discriminant function F(x) is used as the result of recognition of the input pattern. This method does not call for calculating the coupling coefficient γ, and hence does not involve floating-point operations and permits processing with simple integer operations.

As described above, according to the present invention, a discriminant analysis is made between the pattern set of each class and the corresponding rival pattern set, using the difference between the corresponding components of the feature vector and the reference vector and the square of the difference as variables. By this, the difference between these pattern sets can be emphasized, and consequently, the use of the dictionary thus generated increases the pattern recognition accuracy without significantly increasing the memory capacity used and the amount of data to be processed.

It will be apparent that many modifications and variations may be effected without departing from the scope of the novel concepts of the present invention.

What is claimed is:

1. A method of generating a dictionary for pattern recognition in which a feature vector of an input pattern is compared with a reference pattern vector of each class, read out of a pattern recognition dictionary, and a class of the reference pattern vector closest to said input pattern is output as the recognized result of said input pattern, said method comprising the steps of:

a) extracting features of each of a plurality of training patterns each belonging to one of a plurality of predetermined classes and expressing said features of each training pattern as a vector;

b) obtaining, as said reference pattern vector, the mean of said feature vectors of said training patterns of each class;

c) discriminating each of said training patterns of all classes through use of an original distance function using said reference pattern vectors corresponding to each class to obtain for each class, a rival pattern set containing patterns misclassified as belonging to said each class;

d) defining a discriminant function which contains, as first and second variables, the difference between respectively corresponding components of a feature vector of a training pattern and a reference pattern vector and the square of said difference and determining, for each class, parameters of said discriminant function so that a discrimination is made between patterns forming a training pattern set of said each class and patterns forming said rival pattern set for said each class; and e) writing, for each class, parameter information into dictionary means, said parameter information corresponding to the parameters of said original distance function containing said reference pattern vector of said each class and parameters of said discriminant function determined for said each class.

2. A method of generating a dictionary for pattern recognition in which a feature vector of an input pattern is compared with a reference pattern vector of each class, read out of a pattern recognition dictionary, and a class of the reference vector pattern closest to said input pattern is output as the recognized result of said input pattern, said method comprising the steps of:

a) extracting features of each of a plurality of training patterns each belonging to one of a plurality of predetermined classes and expressing said features of each training pattern as a vector;

b) obtaining, as said reference pattern vector, the mean of said feature vectors of said training patterns of each class;

c) discriminating each of said training patterns of all classes through use of an original distance function using said reference pattern vectors corresponding to each class to obtain, for said each class, a rival pattern set containing patterns misclassified as belonging to said each class;

d) defining a discriminant function which contains, as first and second variables, a vector component obtained by projecting the difference between respectively corresponding components of a feature vector of a training pattern and a reference pattern vector into a subspace defined by the eigenvector of a covariance matrix of said class and the square of said vector component, and determining, for each class, parameters of said discriminant function so that a discrimination is made between patterns forming a training pattern set of said each class and patterns forming said rival pattern set for said each class; and e) writing, for said each class, parameter information into dictionary means, said parameter information corresponding to the parameters of said original distance function containing said reference pattern vector of said each class and parameters of said discriminant function determined for said each class.

3. The method of claim 1 or 2, wherein said dictionary means comprises an original dictionary and a discriminant dictionary and said step of writing said parameter information into said dictionary means comprises a step of writing said parameters of said original distance function of each class into said original dictionary and writing said parameters of said discriminant function into said discriminant dictionary.

4. The method of claim 1 or 2, wherein said step of writing said parameter information into said dictionary means comprises a step of writing parameters obtained by modifying said parameter of said original distance function with said parameter of said discriminant function.

5. The method of claim 1 or 2, which further includes a step of defining a learned distance function obtained by additively coupling said original distance function and said discriminant function with a coupling coefficient, discriminating all training patterns of all of said classes by referring to said dictionary means through use of said learned distance function, and determining said coupling coefficient so that the recognition rate resulting from said discrimination becomes maximum, and holding said coupling coefficient.

6. The method of claim 5, which further comprises steps of: discriminating said all training patterns by referring to said dictionary means through use of said learned distance function using said determined coupling coefficient and adding new rival patterns, obtained on the basis of the results of said discrimination, to said rival pattern set of the corresponding class to update said rival pattern set; and making a discrimination based on discriminant analysis between said training pattern set of each class and said updated rival pattern set to update said discriminant function, thereby updating said parameter information of said dictionary means which defines said learned distance function.

7. The method of claim 6, which further comprises a step of obtaining the recognition rate for said all training patterns upon each repetition of said rival pattern set updating step and said parameter information updating step, and ending said repetitive learning of said updating steps when said recognition rate is below the previous one.

8. The method of claim 7, which further comprises a step of obtaining a plurality of dictionaries by holding an updated dictionary upon each updating of said dictionary means, obtaining the recognition rate for said training patterns of each class through utilization of the corresponding parameter information of said plurality of dictionaries, selecting parameter information of one of said dictionaries for each class which maximizes said recognition rate, and reconstructing said dictionary to use said selected parameter as ultimate parameter information for said class.

9. The method of claim 5, which further comprises steps of: determining a temporary coupling coefficient larger than said determined coupling coefficient by a predetermined width, discriminating said all training patterns by referring to said dictionary means through use of said learned distance function using said temporary coupling coefficient, and adding new rival patterns, obtained on the basis of the results of said discrimination, to said rival pattern set of the corresponding class to update said rival pattern set; and making a discrimination based on discriminant analysis between said training pattern set of each class and said updated rival pattern set to update said discriminant function, thereby updating said parameter information of said dictionary means which defines said learned distance function.

10. The method of claim 9, which further comprises a step of obtaining the recognition rate for said all training patterns upon each repetition of said rival pattern set updating step and said parameter information updating step, and ending said repetitive learning of said updating steps when said recognition rate is below the previous one.

11. The method of claim 10, which further comprises a step of obtaining a plurality of dictionaries by holding an updated dictionary upon each updating of said dictionary means, obtaining the recognition rate for said training patterns of each class through utilization of the corresponding parameter information of said plurality of dictionaries, selecting parameter information of one of said dictionaries for each class which maximizes said recognition rate, and reconstructing said dictionary to use said selected parameter information as ultimate parameter information for said class.

12. The method of claim 9, wherein said temporary coupling coefficient is chosen such that when new rival patterns obtained by discriminating all patterns with said learned distance function using said temporary coupling coefficient are added to the corresponding rival pattern set, the number of new rival patterns of said rival patterns set for at least one class is larger than a predetermined value.

13. The method of claim 1 or 2, wherein said rival pattern set for each class contains, as rival patterns, patterns belonging to classes other than the currently noticed one and correctly classified as belonging to said other classes for each of which the difference between the distance from the reference pattern vector of said notice class and the distance from the reference pattern vector of each of said other classes is within a predetermined range.

14. The method of claim 1 or 2, which further comprises a step of generating modified patterns by modifying a plurality of misclassified patterns in said rival pattern for at least one class, discriminating said modified patterns with said original distance function, and adding those modified patterns recognized as rival patterns for said at least one class, as pseudo-rival patterns, to said rival pattern set, and wherein said discriminant analysis is made between said rival pattern set added with said pseudo-rival patterns and the training pattern set of the corresponding class.

15. A pattern recognition method which discriminates an input pattern by referring to dictionary means, and in which a discriminant function is predefined which includes, as first and second variables, the difference between respective corresponding components of a feature vector of each input pattern and the corresponding reference pattern vector and the square of said difference, and said dictionary means has stored therein, for each class, parameter information corresponding to parameters of said discriminant function and parameters of an original distance function, said parameters of said discriminant function being determined so that a discrimination is made by said discriminant function between a set of training patterns of each class and a set of rival patterns of said each class, said rival patterns set including patterns misclassified for each class when all training patterns of all classes are discriminated with said original distance function, and said parameters of said original distance function including said reference pattern vector of each class, said method comprising the steps of:

a) extracting a feature vector of said input pattern;

b) calculating, for each class, the distance between said feature vector of said input pattern and said reference pattern vector by applying said parameter information of each class, read out of said dictionary means, to a learned distance function formed by said original distance function and said discriminant function additively coupled by a predetermined coupling coefficient; and c) determining, as the class to which said input pattern belongs, the class in which to minimize said distance.

16. A pattern recognition method which discriminates an input pattern by referring to dictionary means, and in which a discriminant function is predefined which includes, as first and second variables, a component of a vector and the square of said component, said component of said vector being obtained by projecting the difference between respective corresponding components of a feature vector of each input pattern and the corresponding reference pattern vector into a subspace defined by an eigenvector of a covariance matrix of each class, and said dictionary means has stored therein, for each class, parameter information corresponding to parameters of said discriminant function and parameters of an original distance function, said parameters of said discriminant function being determined so that a discrimination is made by said discriminant function between a set of training patterns of each class and a set of rival patterns of said each class, said rival pattern set including patterns misclassified for each class when all training patterns of all classes are discriminated with said original distance function, and said parameters of said original function including said reference pattern vector of each class, said method comprising the steps of:

a) extracting a feature vector of said input pattern;

b) calculating, for each class, the distance between said feature vector of said input pattern and said reference pattern vector by applying said parameter information of each class, read out of said dictionary means, to a learned distance function formed by said original distance function and said discriminant function additively coupled by a predetermined coupling coefficient; and c) determining, as the class to which said input pattern belongs, the class in which to minimize said distance.

17. The method of claim 15 or 16, wherein said dictionary means comprises an original dictionary and a discriminant dictionary, said parameters of said original distance function being written in said original dictionary and said parameters of said discriminant function being written in said discriminant dictionary.

18. The method of claim 15 or 16, wherein said parameter information is parameters obtained by modifying said parameters of said original distance functions by parameters of said discriminant function.

19. A pattern recognition method which discriminates an input pattern by referring to an original dictionary and a discriminant dictionary and in which a discriminant function is predefined which includes, as first and second variables, a component of a vector and the square of said component, said component of said vector being obtained by projecting the difference between respective corresponding components of a feature vector of each pattern and the corresponding reference pattern vector into a subspace defined by an eigenvector of a covariance matrix of each class, said original dictionary has stored therein, for each class, parameters of an original distance function, and said discriminant dictionary has stored therein parameters of said discriminant function, said parameters of said discriminant function being determined so that a discrimination is made by said discriminant function between a set of training patterns of each class and a set of rival patterns of said each class, said rival pattern set including patterns misclassified for each class when all training patterns of all classes are discriminated with said learned distance function, and said parameters of said original distance function including the reference pattern vector of each class, said method comprising the steps of:

a) extracting a feature vector of said input pattern;

b) calculating, for each class, the distance between said feature vector and said reference pattern vector of said input pattern by applying said parameters of each class, read out of said original dictionary, to said original distance function;

c) selecting a plurality of said calculated distances in increasing order of distance and selecting, as class candidates, a plurality of classes corresponding to said plurality of selected distances; and d) calculating the value of said discriminant function by applying thereto said parameters read out of said discriminant dictionary for each of said class candidates and determining, as the class to which said input pattern belongs, the class candidate which provides the minimum value of said discriminant function.

20. A pattern recognition method which discriminates an input pattern by referring to an original dictionary and a discriminant dictionary and in which a discriminant function is predefined which includes, as first and second variables, the difference between respective corresponding components of a feature vector or each pattern and the corresponding reference pattern vector and the square of said difference, said original dictionary has stored therein, for each class, parameters of an original distance function, and said discriminant dictionary has stored therein parameters of said discriminant function, said parameters of said discriminant function being determined so that a discrimination is made by said discriminant function between a set of training patterns of each class and a set of rival patterns of training patterns of each class and a set of rival patterns of said each class, said rival pattern set including patterns misclassified for each class when all training patterns of all classes are discriminated with said learned distance function, and said parameters of said original distance function including the reference pattern vector of each class, said method comprising the steps of:

a) extracting a feature vector of said input pattern;

b) calculating, for each class, the distance between said feature vector and said reference pattern vector of said input pattern by applying said parameters of each class, read out of said distance dictionary, to said original distance function;

c) selecting a plurality of said calculated distances in increasing order of distance and selecting, as class candidates, a plurality of selected distances; and d) calculating the value of said discriminant function by applying thereto said parameters read out of said discriminant dictionary for each of said class candidate and determining, as the class to which said input pattern belongs, the class candidate which provides the minimum value of said discriminant function.

* * * * *